(12) United States Patent
Hock et al.

(10) Patent No.: US 6,742,836 B2
(45) Date of Patent: Jun. 1, 2004

(54) CAR BODY PART AND METHOD OF ITS PRODUCTION

(75) Inventors: Daniel Hock, Johannesberg (DE); Matthias Ludwig, Vechelde (DE); Marcus Lutz, Gifhorn (DE); Frank Niebuhr, Wilsche (DE)

(73) Assignee: Arvin Meritor GmbH (DE)

( * ) Notice: Subject to any disclaimer, the term of this patent is extended or adjusted under 35 U.S.C. 154(b) by 0 days.

(21) Appl. No.: 10/383,799

(22) Filed: Mar. 7, 2003

(65) Prior Publication Data

US 2003/0168890 A1 Sep. 11, 2003

(30) Foreign Application Priority Data

Mar. 7, 2002 (DE) .......................................... 102 10 141

(51) Int. Cl.$^7$ ................................................ B60J 7/00
(52) U.S. Cl. ......................... 296/210; 296/3; 224/324; 224/326; 224/325; 224/309
(58) Field of Search .......................... 296/210, 3, 901, 296/213, 208; 224/309, 324, 326, 322, 325, 327, 315, 321; 362/105; 156/146; 29/434

(56) References Cited

U.S. PATENT DOCUMENTS

| | | | | |
|---|---|---|---|---|
| 3,473,773 A | * | 10/1969 | Meyer | 224/309 |
| 3,893,606 A | * | 7/1975 | Hofmann | 224/309 |
| 4,132,335 A | * | 1/1979 | Ingram | 224/324 |
| 4,222,508 A | * | 9/1980 | Bott | 224/324 |
| 4,239,139 A | * | 12/1980 | Bott | 224/324 |
| 4,254,986 A | * | 3/1981 | Nakamura | 296/210 |
| 4,265,383 A | * | 5/1981 | Ferguson | 224/326 |
| 4,269,340 A | * | 5/1981 | Kowalski et al. | 224/326 |
| 4,270,681 A | * | 6/1981 | Ingram | 224/326 |
| 4,295,587 A | * | 10/1981 | Bott | 224/322 |
| 4,364,498 A | * | 12/1982 | Kuus et al. | 224/309 |
| 4,364,500 A | * | 12/1982 | Bott | 224/326 |
| 4,406,386 A | * | 9/1983 | Rasor et al. | 224/325 |
| 4,416,406 A | * | 11/1983 | Popeney | 224/325 |
| 4,427,141 A | * | 1/1984 | Bott | 224/326 |
| 4,432,478 A | * | 2/1984 | Bott | 224/326 |

(List continued on next page.)

FOREIGN PATENT DOCUMENTS

| | | |
|---|---|---|
| DE | 31 50 027 A | 6/1983 |
| DE | 3209912 | 10/1983 |
| DE | 3309131 | 10/1988 |
| DE | 3826662 | * 2/1990 |
| DE | 4007391 | 9/1990 |
| DE | 41 37 707 | * 5/1993 |
| DE | 4417270 | * 2/1996 |
| DE | 199 47 776 A | 4/2001 |
| DE | 100 28 320 A | 12/2001 |
| EP | 0425240 A2 | 5/1991 |
| EP | 1095843 A3 | 11/2001 |
| JP | 60011337 A | 1/1985 |
| JP | 6 247221 | * 9/1994 |

OTHER PUBLICATIONS

International Search Report, dated Apr. 26, 2002.
European Search Report, dated Jan. 26, 2004.

*Primary Examiner*—Kiran Patel
(74) *Attorney, Agent, or Firm*—Carlson, Gaskey & Olds

(57) ABSTRACT

A car body part for a motor vehicle has an outer skin formed of an at least partially deformable material. An inner layer is formed of a foamed plastic. A mounting part which is placed in a recess of the outer skin and is anchored via an interlocking fit between the outer skin and a deformed portion of the mounting part. The interlocking fit may be created when the foamed plastic is expanded in a mold, which increases interior pressure within the mold and deforms the outer skin against the mounting part.

12 Claims, 3 Drawing Sheets

U.S. PATENT DOCUMENTS

| | | | |
|---|---|---|---|
| 4,475,765 A | | 10/1984 | Spiegel |
| 4,487,349 A | * | 12/1984 | Kudo .......................... 224/322 |
| 4,501,385 A | * | 2/1985 | Bott ........................... 224/325 |
| 4,792,180 A | | 12/1988 | Jacobsen et al. |
| 4,899,917 A | * | 2/1990 | Bott ........................... 224/327 |
| 4,911,348 A | * | 3/1990 | Rasor et al. ................. 224/326 |
| 4,930,279 A | * | 6/1990 | Bart et al. ................... 296/213 |
| 4,982,886 A | * | 1/1991 | Cucheran .................... 224/326 |
| 5,013,083 A | * | 5/1991 | Yada et al. .................. 296/210 |
| 5,120,593 A | * | 6/1992 | Kurihara ..................... 296/210 |
| 5,133,490 A | * | 7/1992 | Cucheran .................... 224/326 |
| 5,207,366 A | * | 5/1993 | Cucheran .................... 224/309 |
| 5,306,156 A | * | 4/1994 | Gibbs et al. ................. 224/315 |
| 5,413,398 A | * | 5/1995 | Kim ............................ 296/210 |
| 5,470,120 A | * | 11/1995 | Christensen .................... 296/3 |
| 5,553,761 A | * | 9/1996 | Audoire et al. .............. 224/326 |
| 5,624,266 A | * | 4/1997 | Gibbs et al. ................. 224/315 |
| 5,713,498 A | * | 2/1998 | Cucci .......................... 224/309 |
| 5,758,947 A | * | 6/1998 | Glatt ........................... 362/105 |
| 5,775,557 A | * | 7/1998 | Arvidsson .................... 224/309 |
| 5,782,392 A | * | 7/1998 | Yamamoto ................... 224/309 |
| 5,794,827 A | * | 8/1998 | Cucheran et al. ............ 224/326 |
| 5,826,766 A | * | 10/1998 | Aftanas ........................ 224/322 |
| 5,833,103 A | * | 11/1998 | Rak ............................. 224/321 |
| 5,839,615 A | * | 11/1998 | Ray et al. .................... 224/326 |
| 5,975,391 A | * | 11/1999 | Aftanas et al. .............. 224/309 |
| 6,012,766 A | * | 1/2000 | Myles ......................... 296/210 |
| 6,197,140 B1 | * | 3/2001 | Havens ........................ 156/146 |
| 6,216,928 B1 | * | 4/2001 | Blankenburg et al. ....... 224/326 |
| 6,267,281 B1 | * | 7/2001 | Nerling et al. .............. 224/309 |
| 6,287,669 B1 | * | 9/2001 | George et al. .............. 296/208 |
| 6,345,859 B1 | * | 2/2002 | Thomas ....................... 224/326 |
| 6,526,644 B2 | * | 3/2003 | Miho et al. ................... 29/434 |
| 6,592,177 B1 | * | 7/2003 | Mathew ....................... 296/210 |
| 2003/0038510 A1 | * | 2/2003 | Yoon ........................... 296/210 |
| 2003/0168889 A1 | * | 9/2003 | Comert et al. .............. 296/210 |

\* cited by examiner

CAR BODY PART AND METHOD OF ITS PRODUCTION

This application claims priority from Federal Republic of Germany Patent Application No. 102 10 141.8 filed on Mar. 7, 2002.

TECHNICAL FIELD

The invention relates to a car body part for a motor vehicle, in particular a roof module, as well as to a method of producing such a car body part.

BACKGROUND OF THE INVENTION

Vehicle bodies are constructed by attaching car body parts together. As an example, a roof railing may be attached to a roof module or a second car body part. Typically, the prior art has provided either additional fastening elements or other particular provisions for connecting the two car body parts. Usually, holes are formed in the car body part. This has disadvantages both in terms of assembly time and expense. Also, with such connections, tolerances have to be kept small so that undesirably large gaps will not occur between the car body parts.

It is an object of this invention to provide a car body part which can be fastened to other car body parts inexpensively and which provides visually appealing small gaps.

BRIEF SUMMARY OF THE INVENTION

According to the invention, a car body part for a motor vehicle has an outer skin formed from an at least partially deformable material, and an inner layer formed of a foamed plastic. A mounting part is placed in a recess of the outer skin and is anchored there by an interlocking fit. A main feature of the invention is the basic idea of clamping the mounting part in the recess of the outer skin. To this end, the invention may use an elastic pretension of the car body part. A force holding the mounting part in the recess is increased, by providing anchoring protrusions on the mounting part. The anchoring provisions are forced into the outer skin of the car body part. By positioning the mounting part in the recess, low dimensional tolerances are achieved.

To clamp the outer skin against the mounting part, it is particularly suitable to use the inner layer. The inner layer is formed of a foamed plastic. The inner layer may also be provided with reinforcement fibers, for instance glass fibers. The formed inner layer has the particular advantage that a foaming pressure generated during foaming of the inner layer, can be used to strongly press the outer skin against the mounting part and deform the outer skin in the process. In this way, the mounting part is received with an interlocking fit.

It is particularly suitable to use a rail as the mounting part. The rail can be, for instance, an extruded aluminum profile with a plurality of anchoring protrusions on an outer surface. As mentioned above, the anchoring protrusions provide a positive anchoring of the mounting part in the outer skin. It is also possible to use a mounting part in the form of e.g. a threaded piece, which may serve as a base part of a roof antenna, for instance.

It is also particularly suitable to use a second car body part having a bent-off edge portion which is accommodated in the recess of the first car body part. This provides assemblies which on the one hand are preferably formed from deep-drawn plastic parts, while still having dimensions or shapes which could not be obtained if formed in one piece.

Preferably the recess in the outer skin has a rectangular cross-section and the mounting part is fully received in the recess. This makes it possible to fasten a mount-on part, such as a roof railing, to the mounting part, if required. On the other hand, if no mount-on part is used, a covering may be attached which is flush with the outer surface of the outer skin to ensure an acceptable visual appearance.

The mounting part may also be designed to terminate flush with the outer surface of the outer skin and match the curvature of the outer skin. In this way, a visually uninterrupted outer contour is achieved.

The desired deformability of the outer skin is provided if the outer skin is made of plastic. While the outer skin is deformable, the inner layer provides the required strength.

When plastic is used for the outer skin, then the recess in the outer skin can also be provided with an undercut. The mounting part may latch in place automatically behind the undercut. Once the inner layer is formed, the force holding the mounting part in the outer skin is further improved. An undercut will not raise problems removing the outer skin from a mold, because the yielding nature of the plastics material is sufficiently high.

A car body part according to the invention can be a roof module. In this case the mounting part may be one which allows the simple attachment of the various mount-on parts typically provided on a roof module.

The invention also provides a method of producing a car body part and, in particular, a roof module. In this method, an outer skin having a recess is formed. A mounting part is then placed in the recess. The outer skin, including the mounting part, is placed in a foaming mold. A foamed inner layer is applied on the rear side of the outer skin. A foaming pressure generated in this process strongly presses the outer skin against the mounting part. In this way, the mounting part is firmly anchored in the recess. This method thus makes use of the existing foaming pressure, for fastening the mounting part to the outer skin. Hence, additional process steps are not required which results in reduced process costs.

The outer skin can be deep-drawn, in particular, to form the recess for receiving the mounting part. In this way the recess can be produced in a very cost-effective manner. In fact, the recess can be formed in one single step during formation of the outer skin.

DETAILED DESCRIPTION OF THE PREFERRED EMBODIMENTS

Figure 1:
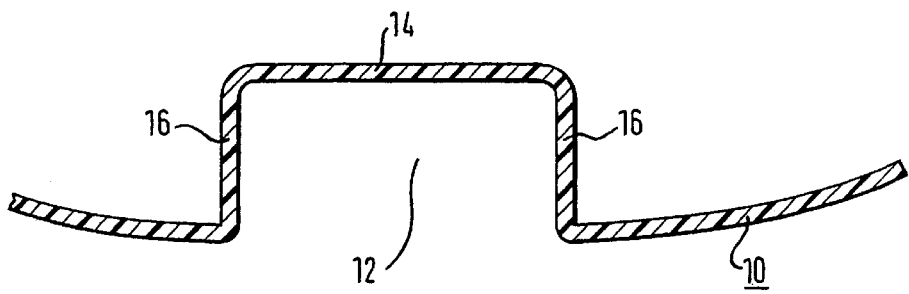
FIG. 1 is a schematic, partial sectional view of an outer skin for a car body part according to a first embodiment of the invention.

FIG. 1 shows an outer skin 10 of a roof module for a motor vehicle according to a first embodiment. The outer skin 10 is made of plastic and has been deep-drawn, to form a recess 12 with a bottom 14 and two side walls 16.

Figure 2:
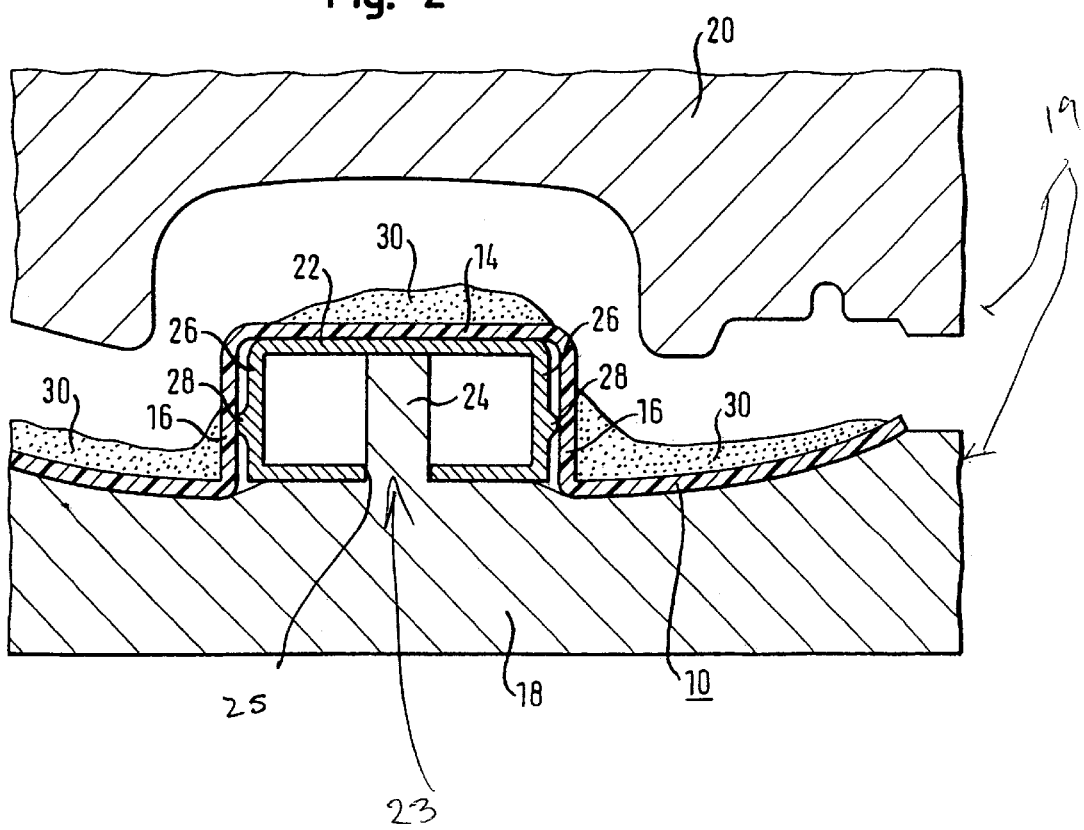
FIG. 2 is a schematic, partial sectional view of the outer skin of FIG. 1 inserted in a foaming tool and provided with a mounting part.

In FIG. 2 the outer skin 10 has been placed in a foaming mold which has a lower part 18 and an upper part 20. A mounting part 22 is placed in recess 12. In this embodiment, the mounting part 22 is a rail made of aluminum and having a rectangular cross-section. The mounting part 22 has one side lying against the bottom 14 of the recess 12 across a large surface area. On an opposite side, the mounting part 22 has a slot 25, so that a mount-on part can be later inserted into the mounting part 22. The lower part 18 of the foaming mold is provided with a web 24 which projects into the interior of the mounting part through the slot 25. Side surfaces 26 of mounting part 22 are positioned opposite the side walls 16 of recess 12. Side surfaces 26 are provided with a plurality of anchoring protrusions 28, realized here as several individual bumps. That is, there are anchoring protrusions spaced along a direction extending into the plane of the Figure. As can be seen in FIG. 2, the mounting part 22 contacts the side walls 16 of the recess 12 by anchoring protrusions 28 with the remainder of side surfaces 26 spaced from side walls 16.

A foamable plastic material 30 is applied onto a side of the outer skin 10. This side will face the vehicle interior when the car body part is attached as part of a vehicle.

After the foamable plastic material 30 is applied, the foaming mold 19 will be closed. As known, the foamable plastic material 30 will cure, and increase in volume. Due to the increase in volume of the foamable plastic material 30 an interior pressure in the foaming mold 19 will increase. During this process, the interior pressure strongly presses the bottom 14 and side walls 16 of the recess 12 against the mounting part 22. The mounting part does not give way during this pressing due to its strength, and the support provided by web 24. The interior pressure does deform the side walls 16 of the recess 12 against the side surfaces 26 of the mounting part 22. That is, sidewalls 16 are deformed such that they receive the anchoring protrusions 28 and the gap between the side surfaces 26 of the mounting part and the outer skin disappears.

Figure 3:
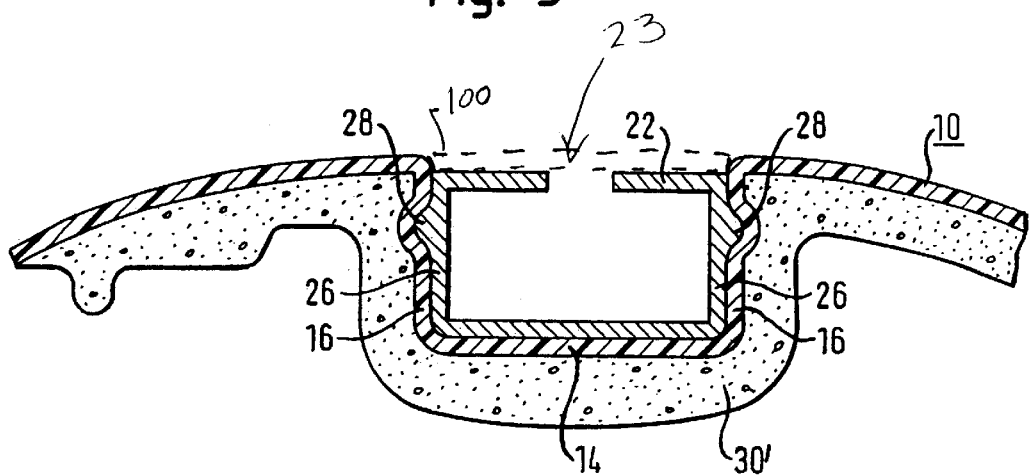
FIG. 3 is a schematic, partial sectional view of the finished car body part according to the first embodiment.

FIG. 3 shows the roof module in its finished state. The foamable plastic material is cured and forms an inner layer 30'. The strength of inner layer 30' ensures a tight fit between the outer skin 10 and mounting part 22 in the region of the recess 12, and in particular between side surfaces 26 and anchoring protrusions 28. In this way the mounting part 22 is anchored on the car body part with an interlocking fit, so that it is possible to attach mount-on parts. If mount-on parts are not to be used, a covering, shown in phantom at 100 can be attached flush with the outer side of the outer skin, so that a visually attractive appearance will be produced.

Figure 4:
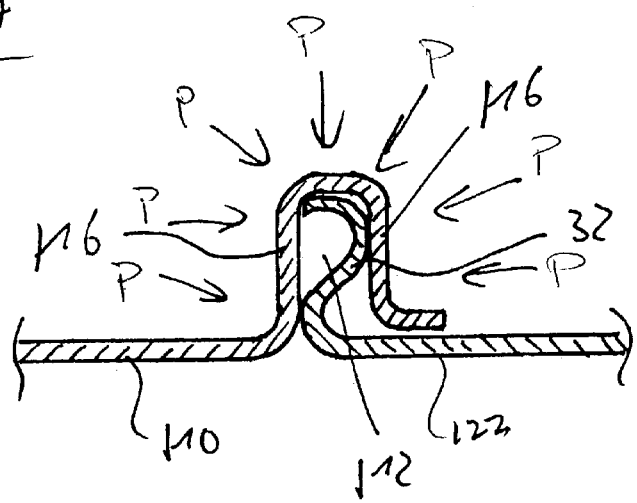
FIG. 4 is a schematic, partial sectional view of an outer skin for a car body part according to a second embodiment of the invention.
Figure 5:
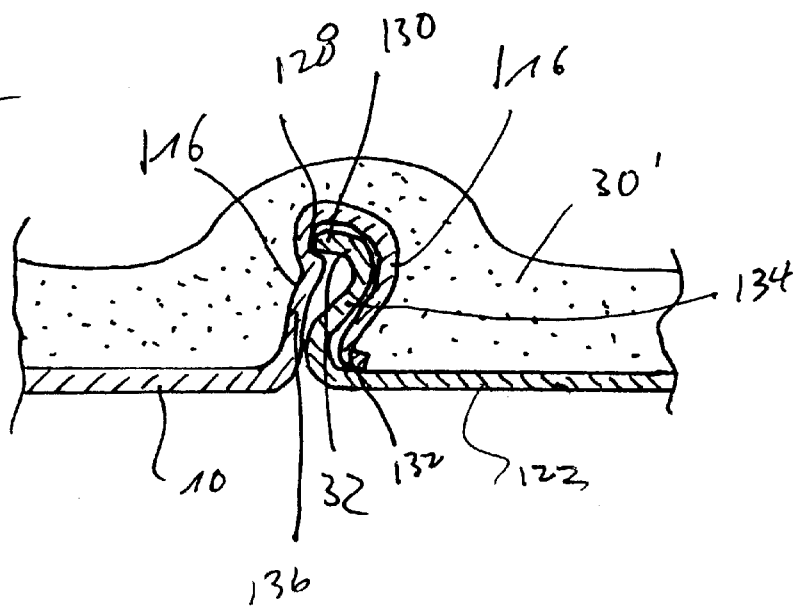
FIG. 5 is a schematic, partial sectional view of the finished car body part according to the second embodiment.

FIGS. 4 and 5 show a second embodiment of the invention. The main difference between the first and the second embodiment is that in the second embodiment, the mounting part is not used for mounting other parts. Instead, the second embodiment allows a car body element to be directly mounted to a first car body part. This allows large assemblies to be made from plastic which otherwise could not be produced integrally. As an example, the embodiment is useful for elements they cannot be deep-drawn due to their geometry or since they are to feature different colors at some portions.

As is shown in FIG. 4, the outer skin 110 is provided with a recess 112 having a rectangular cross-section. The depth of recess 112 is preferably greater than the width. A mounting part 122 is provided with an edge portion 32 which is curved in two directions (generally in the shape of a question mark). Edge portion 32 is inserted into the interior of the recess 112.

The two parts 110 and 122 are placed into a mold and a foamed layer is applied, as in the first embodiment. When the foamable plastics material is cured, a foaming pressure is applied to those portions of the outer skin 110 which form the recess. The foaming pressure is indicated in FIG. 4 by means of the arrows P, and results in a deformation of the side walls 116 of the recess 112 to contact the edge portion 32. Thus, the edge portion 32 is held in the recess in a form-locking manner.

As can be seen, a forward end 130 of the edge portion 32 has deformed a locking ledge 128 in the side wall 116. A similar ledge is formed at 132 beneath a curved back portion 134 of the edge portion 32. That is, the generally question mark shape of edge portion 32 results in one of the side walls 116 having a lower portion 136 extending into a ledge 128 around the forward end 132 of the edge portion 32. The other wall 116 is bent inwardly at 132 beneath the back 134 of the edge portion 32.

While embodiments of this invention have been disclosed, a work of ordinary skill in the art would recognize that certain modifications would come within the scope of this invention. For that reason the following claims should be studied to determine the true scope and content of this invention.

What is claimed is:

1. A car body part for a motor vehicle comprising:
    an outer skin formed of an at least partially deformable material, said outer skin having a recess;
    an inner layer formed of foamed plastic; and
    a mounting part placed in said recess, wherein the mounting part is anchored in the recess by an interlocking fit between the recess and the mounting part.

2. The car body part of claim 1 wherein the interlocking fit is created by pressure applied by the inner layer onto the outer skin, wherein the pressure from the inner layer deforms the outer skin at the recess against the mounting part.

3. The car body part of claim 1 wherein the inner layer is reinforced with glass fibers.

4. The car body part of claim 1 wherein the mounting part has at least one anchoring protrusion that fits snuggly against the outer skin.

5. The car body part of claim 1 wherein the mounting part is a rail having an outer surface provided with a plurality of anchoring protrusions.

6. The car body part of claim 5 wherein the rail is an extruded aluminum part.

7. The car body part of claim 1 wherein said mounting part is a second car body part.

8. The car body part of claim 7 wherein said second car body part has an edge portion which is curved in two opposite directions, said edge portion being positioned within said recess.

9. The car body part of claim 1 wherein the recess has a rectangular cross-section, said mounting part being fully received in the recess.

10. The car body part of claim 1 wherein the mounting part is accessible from a side of said outer skin facing away from the inner layer.

11. The car body part of claim 1 wherein the outer skin is made of plastic.

12. The car body part of claim 1 wherein the car body part is a roof module.

* * * * *